(12) United States Patent
Büttner et al.

(10) Patent No.: US 10,090,719 B2
(45) Date of Patent: *Oct. 2, 2018

(54) RELUCTANCE MOTOR AND ASSOCIATED ROTOR

(71) Applicant: SIEMENS AKTIENGESELLSCHAFT, München (DE)

(72) Inventors: Klaus Büttner, Hollstadt (DE); Klaus Kirchner, Ostheim (DE); Matthias Warmuth, Windshausen (DE); Nico Wolf, Trusetal (DE)

(73) Assignee: Siemens Aktiengesellschaft, München (DE)

( * ) Notice: Subject to any disclaimer, the term of this patent is extended or adjusted under 35 U.S.C. 154(b) by 333 days.

This patent is subject to a terminal disclaimer.

(21) Appl. No.: 14/783,498

(22) PCT Filed: Feb. 28, 2014

(86) PCT No.: PCT/EP2014/053981
§ 371 (c)(1),
(2) Date: Oct. 9, 2015

(87) PCT Pub. No.: WO2014/166674
PCT Pub. Date: Oct. 16, 2014

(65) Prior Publication Data
US 2016/0056673 A1 Feb. 25, 2016

(30) Foreign Application Priority Data

Apr. 11, 2013 (EP) ..................................... 13163340
Apr. 15, 2013 (EP) ..................................... 13163688

(51) Int. Cl.
*H02K 37/00* (2006.01)
*H02K 1/24* (2006.01)
(Continued)

(52) U.S. Cl.
CPC .......... *H02K 1/246* (2013.01); *B60L 11/1803* (2013.01); *B60L 15/20* (2013.01);
(Continued)

(58) Field of Classification Search
CPC ........ H02K 1/246; H02K 1/28; H02K 15/022; H02K 15/02; H02K 2201/09;
(Continued)

(56) References Cited

U.S. PATENT DOCUMENTS 5,801,478 A  9/1998 Nashiki
5,818,140 A  10/1998 Vagati
(Continued)

FOREIGN PATENT DOCUMENTS

DE  102011079843 A1  1/2013
EP  0141187 A1  5/1985
(Continued)

*Primary Examiner* — Forrest M Phillips
(74) *Attorney, Agent, or Firm* — Henry M. Feiereisen LLC

(57) ABSTRACT

A rotor for a reluctance motor having a laminate stack of layers is disclosed. Each layer has at least one magnetically-conductive rotor lamination, and in each layer a plurality of flux-conducting sections are formed by the at least one rotor lamination, which flux-conducting sections are separated from one another by a nonmagnetic region. The invention addresses the problem of enabling a high torque and a high speed. For this purpose, an insert disk is arranged between at least two of the layers, connected in each case to at least two flux-conducting sections of one of the layers or both of the layers between which said insert disk is arranged and, as a result, connects said flux-conducting sections to one another beyond the nonmagnetic region located there between.

14 Claims, 4 Drawing Sheets

(51) Int. Cl.
  *B60L 11/18* (2006.01)
  *B60L 15/20* (2006.01)
  *H02K 1/28* (2006.01)
  *H02K 15/02* (2006.01)

(52) U.S. Cl.
  CPC ............. *H02K 1/28* (2013.01); *H02K 15/022* (2013.01); *B60L 2220/18* (2013.01); *B60L 2220/50* (2013.01); *B60L 2240/421* (2013.01); *B60L 2240/423* (2013.01); *H02K 15/02* (2013.01); *H02K 2201/09* (2013.01); *Y02T 10/641* (2013.01); *Y02T 10/644* (2013.01); *Y02T 10/645* (2013.01); *Y02T 10/7005* (2013.01); *Y02T 10/72* (2013.01); *Y02T 10/7275* (2013.01)

(58) Field of Classification Search
  CPC .. B60L 11/1803; B60L 15/20; B60L 2220/18; B60L 2220/50; B60L 2240/421; B60L 2240/423; Y02T 10/641; Y02T 10/644; Y02T 10/645; Y02T 10/7005; Y02T 10/7275
  USPC .......................................................... 310/46
  See application file for complete search history.

(56) References Cited

U.S. PATENT DOCUMENTS

| | | | |
|---|---|---|---|
| 8,836,193 B2 | 9/2014 | Büttner et al. | |
| 8,963,394 B2 | 2/2015 | Büttner et al. | |
| 9,800,125 B2 * | 10/2017 | Ballweg | H02K 19/14 |
| 2012/0133236 A1 | 5/2012 | Büttner et al. | |
| 2012/0169158 A1 | 7/2012 | Büttner et al. | |
| 2012/0205996 A1 | 8/2012 | Büttner et al. | |
| 2013/0175892 A1 | 7/2013 | Büttner et al. | |
| 2013/0187512 A1 | 7/2013 | Büttner et al. | |
| 2013/0234543 A1 | 9/2013 | Büttner et al. | |
| 2013/0257197 A1 * | 10/2013 | Buttner | H02K 9/08 310/54 |
| 2014/0217840 A1 * | 8/2014 | Buttner | H02K 1/20 310/52 |
| 2015/0207378 A1 * | 7/2015 | Buttner | H02K 5/20 310/54 |
| 2015/0349616 A1 * | 12/2015 | Buttner | H02K 17/165 310/211 |

FOREIGN PATENT DOCUMENTS

| | | |
|---|---|---|
| EP | 621677 A2 | 10/1994 |
| EP | 1 130 746 A1 | 9/2001 |
| EP | 2442432 A2 | 4/2012 |
| JP | H09117082 A | 5/1997 |
| JP | H10271779 A | 10/1998 |
| JP | 2000299947 A | 10/2000 |
| JP | 2001238418 A | 8/2001 |
| JP | 2002095227 A | 3/2002 |
| SU | 13 63 379 A1 | 12/1987 |
| WO | WO 9933156 A1 | 7/1999 |
| WO | WO 2008/037849 A1 | 4/2008 |
| WO | WO 2011018119 A1 | 2/2011 |

* cited by examiner

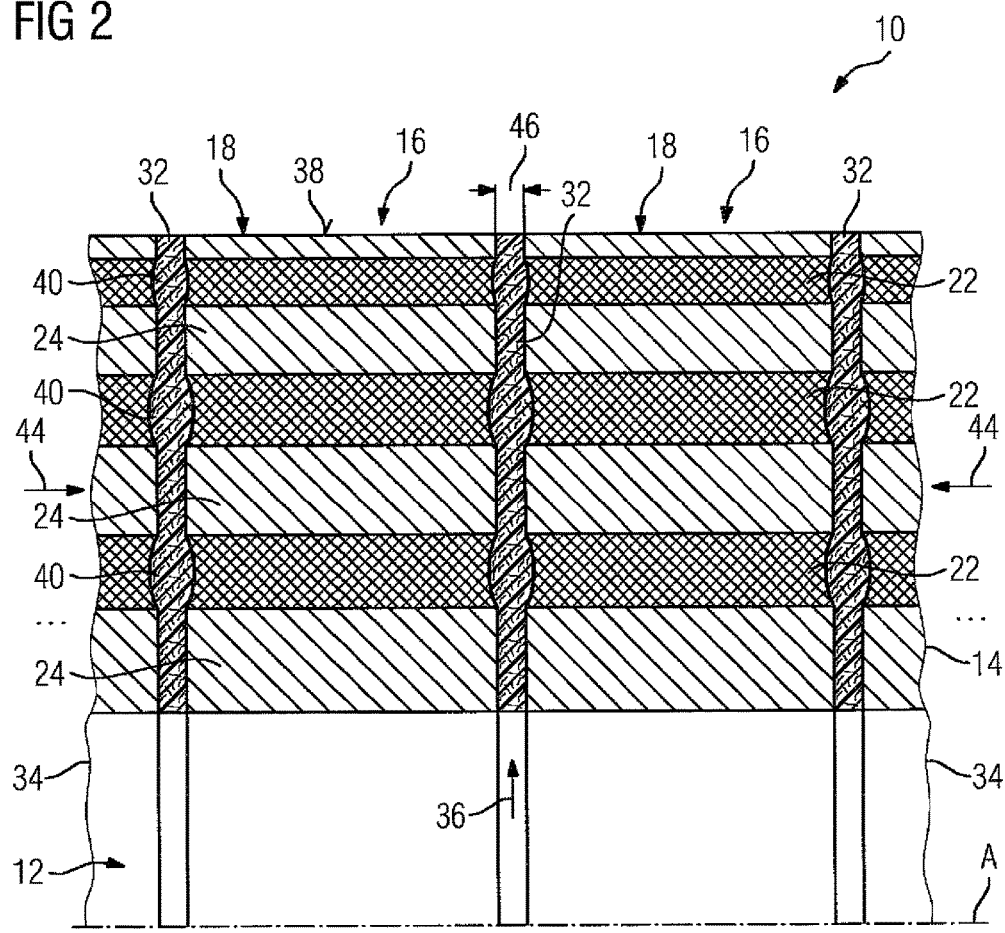

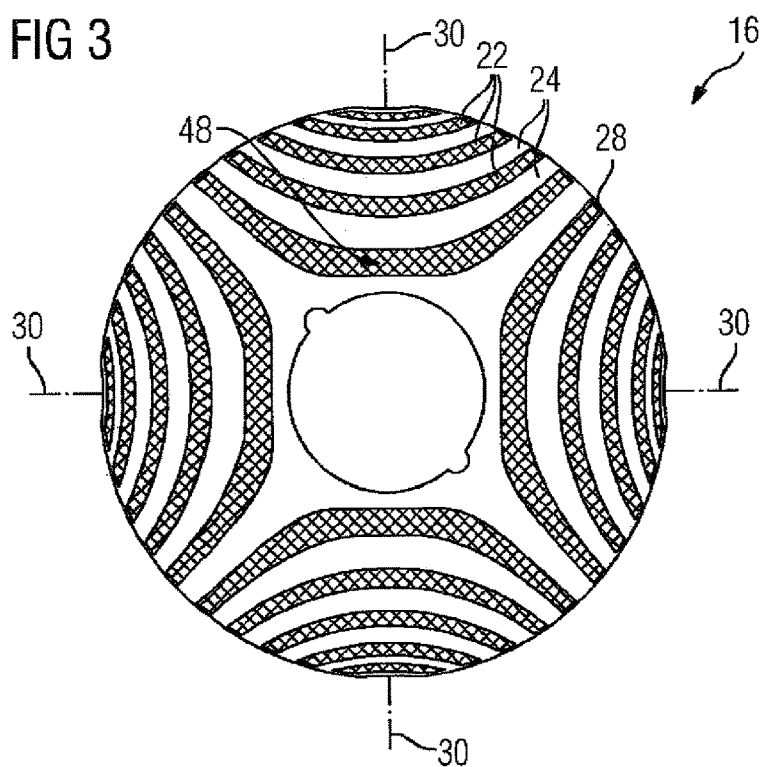
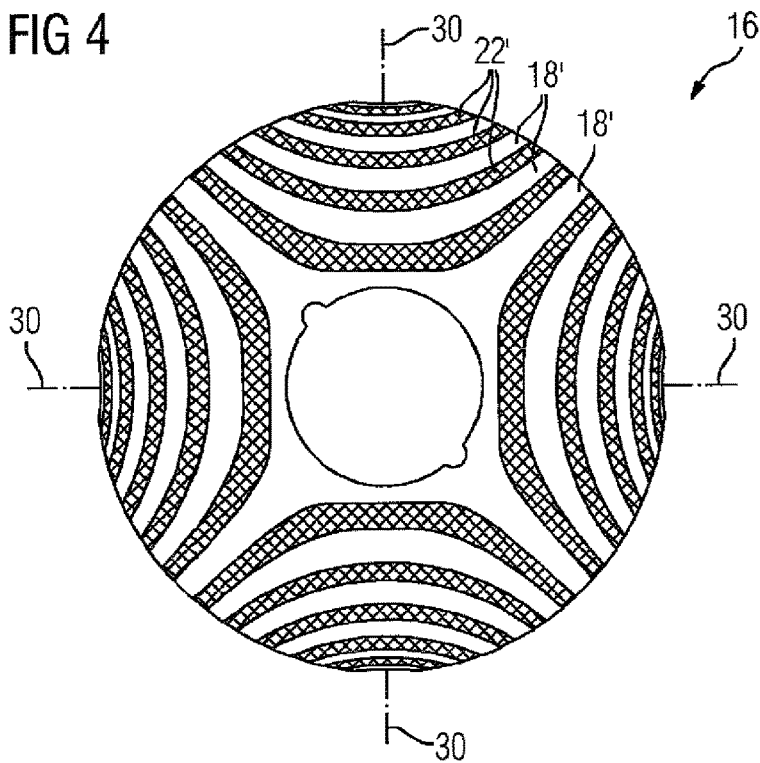

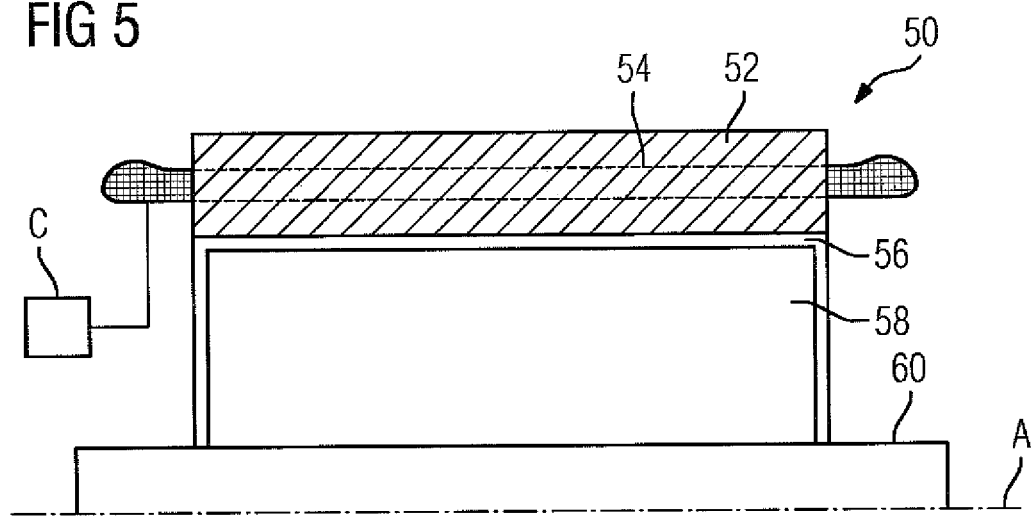
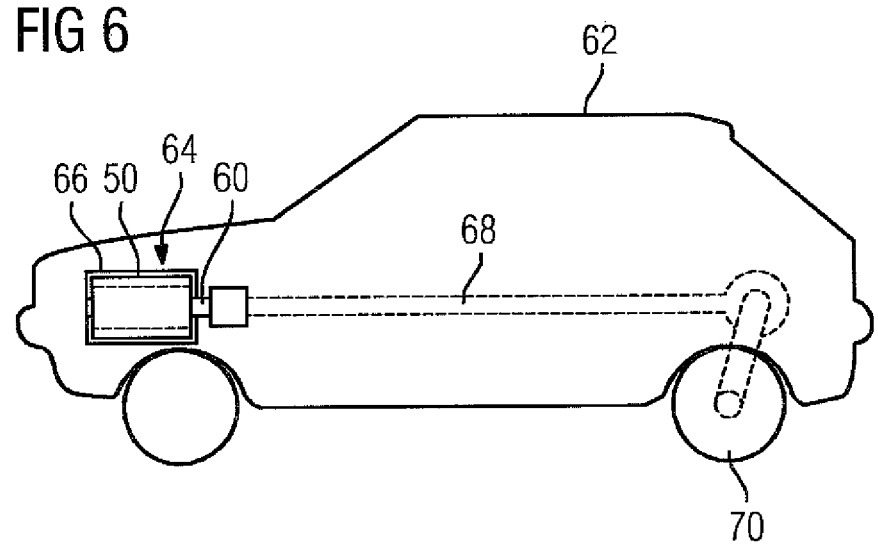

RELUCTANCE MOTOR AND ASSOCIATED ROTOR

CROSS-REFERENCES TO RELATED APPLICATIONS

This application is the U.S. National Stage of International Application No. PCT/EP2014/053981, filed Feb. 28, 2014, which designated the United States and has been published as International Publication No. WO 2014/166674 and which claims the priorities of European Patent Applications, Serial Nos. 13163340.6, filed Apr. 11, 2013, and 13163688.8, filed Apr. 15, 2013, pursuant to 35 U.S.C. 119(a)-(d).

BACKGROUND OF THE INVENTION

The invention relates to a rotor for a reluctance motor, to a reluctance motor with such a rotor, to a motor vehicle and to a method for manufacturing the said rotor. The rotor has a number of individual sheets electrically insulated from one another which are stacked on one another into a laminated core.

A rotor for a reluctance motor is known from U.S. Pat. No. 5,818,140 A. A rotor is described therein of which the laminated core consists of rotor sheets having punched-out sections. This rotor is also referred to here as a Vagati rotor. The punched-out sections produce curved, strip-shaped metal sections which serve as flux-guidance sections and guide the magnetic flux in the way necessary for providing the necessary reluctance of the rotor. The punched-out sections mean that air, i.e. a non-magnetic area which acts as a magnetic flux inhibitor, is located between the individual flux-guidance sections. The strip-shaped flux-guidance sections produce a high torque yield. Because of the non-magnetic areas, the reactance of the laminated core in the direction of the q-axis, i.e. the magnetic inhibition direction, is comparatively small. The strip-shaped flux-guidance sections run transverse to the q-axis and connect adjacent poles of the rotor in the circumferential direction, i.e. the d-axes. The punched-out sections for providing the non-magnetic areas or for embodying the flux-guidance sections lead to a weakening of the mechanical stability of the laminated core however, so that the rotor described is not suitable for high speeds, especially not for speeds in excess of 3,000 revolutions per minute. For this reason reluctance rotors of the type described are not suitable for the speed required by motor vehicles with electric drives.

SUMMARY OF THE INVENTION

The underlying object of the invention is to specify a rotor of the type described at the start which makes possible both a high torque and also a high speed, so that it is especially suitable as a component of an electric drive for an electric vehicle.

According to one aspect of the present invention, the object is achieved by a rotor for a reluctance motor, wherein the rotor has a laminated core including a number of layers electrically insulated from one another, extending radially away from an axis of rotation of the rotor, wherein each layer has at least one magnetically-conductive rotor sheet and in each layer overall a number of flux guidance sections are formed by the at least one rotor sheet, which are separated from one another by a non-magnetic area, wherein an insert disk is disposed between at least two of the layers, which is linked in each case to at least two flux guidance sections of one of the layers or of both layers, between which it is disposed and through this connects these flux guidance sections to each other across the non-magnetic area located between them.

According to another aspect of the present invention, the object is achieved by a reluctance motor, which includes a rotor as set forth above.

According to yet another aspect of the present invention, the object is achieved by a motor vehicle having a reluctance motor as set forth above and also a drive motor for driving the motor vehicle.

According to yet another aspect of the present invention, the object is achieved by a method for manufacturing a rotor as set forth above, wherein, for forming each magnetic layer of the laminated core, a magnetically conductive metal sheet is provided, which has the flux guidance sections of the layer and in which cutouts are provided as the non-magnetic areas between the flux guidance sections, and the metal sheets are fitted into the laminated core and in this process one insert disc is disposed in each case between at least two of the sheets and is connected to at least one of the adjoining sheets.

Advantageous developments of the invention are given by the dependent claims.

The inventive rotor is a reluctance rotor, i.e. it is intended for a reluctance motor. In a known way the inventive rotor thus has a laminated core, i.e. a stack of a number of soft-magnetic rotor sheets electrically insulated from one another, which in each case extend radially away from an axis of rotation of the rotor. In other words the rotor sheets are threaded on or layered along the axis of rotation. The inventive rotor is oriented to the reluctance rotor of Vagati (U.S. Pat. No. 5,818,140 A) described at the start. Thus each layer of the laminated core has a magnetically-conductive rotor sheet wherein a number of flux-guidance sections for a magnetic flux are formed by punched-out sections for instance. The flux-guidance sections are in the known way especially strip-shaped and/or connect two adjacent d-axes of the rotor in the circumferential direction. The flux-guidance sections are separated from one another in each case by a non-magnetic area, i.e. for example the punched-out cutouts. The non-magnetic areas act as magnetic flux inhibitors and preferably extend in each case between two adjacent q-axes of the rotor in the circumferential direction. Magnetic here is especially understood as ferromagnetic, preferably soft-magnetic. Correspondingly non-magnetic or amagnetic is especially understood here as non-ferromagnetic, especially non-soft-magnetic. To this end the non-magnetic areas are filled in each case with air or with a polymer, especially synthetic resin.

During a rotation of the rotor centrifugal forces act on the individual flux-guidance sections, which act radially outwards from these individual areas of the rotor sheet away from the axis of rotation. However the mechanical load able to be imposed on the rotor is weakened by the non-magnetic areas, i.e. the punched-out sections for example.

In order to compensate for this mechanical weakening by the provision of the non-magnetic areas, in the inventive rotor an insert disc is disposed between two or more of the layers, i.e. the rotor sheets, for example a film made of a polymer. This insert disc does not have the characteristic punched-out sections for the rotor sheets but by contrast bridges these non-magnetic areas. The insert disc is rigidly connected here to at least two of the flux-guidance sections of one of the rotor sheets or also both rotor sheets between which the insert disc is disposed. Through this these flux-guidance sections are connected to each other by the insert disc beyond the non-magnetic area located between them.

Thus the inventive rotor has the advantage that a flux-guidance section which is located further outwards in the radial direction (from the axis of rotation) than another flux-guidance section and which therefore experiences a greater centrifugal force than the flux-guidance section lying further inwards can now direct a part of the centrifugal force via the insert disc to the flux-guidance section lying further inwards. Through this the comparatively large centrifugal forces acting on the outside of the rotor are distributed radially inwards to the entire laminated core. This leads to a mechanical stabilization of the rotor.

The number of insert sections in the laminated core enables a modular speed suitability to be set. For the highest stability insert discs are provided here between each sheet, for lower speed stability for example between each second or each third sheet.

BRIEF DESCRIPTION OF THE DRAWINGS

The inventive method is used for manufacturing a form of embodiment of the inventive rotor. To form each magnetic layer of the laminated core a magnetically-conductive sheet is provided in each case. Each sheet in this case has the described strip-shaped flux-guidance sections of a layer. To this end the sheet can be punched for example so that the non-magnetic areas are produced as cutouts. In order to now manufacture the laminated core the sheets are threaded on to form the laminated core and when this is done an insert disc is disposed in each case between at least two of the sheets, especially between all sheets or at least each second or third sheet, and is connected to at least one of the adjoining sheets.

Up to this point the way in which the rotor has been described is that the laminated core of the rotor in each case is formed from individual rotor sheets layered onto each other, which in each case form a layer of the laminated core. However there is another form of embodiment of the invention in which each layer is not formed from an individual rotor sheet with cutouts, but at least one of the layers has a number of rotor sheets separated from one another, of which each forms one of the flux-guidance sections of the layer. These individual flux-guidance sections are thus not joined to one another by soft-magnetic areas. Instead this form of embodiment of the inventive rotor is constructed in the manner also described with at least one insert disc between two of the layers. Without the soft-magnetic connections between the flux-guidance sections an especially large reluctance is produced.

Figure 1:
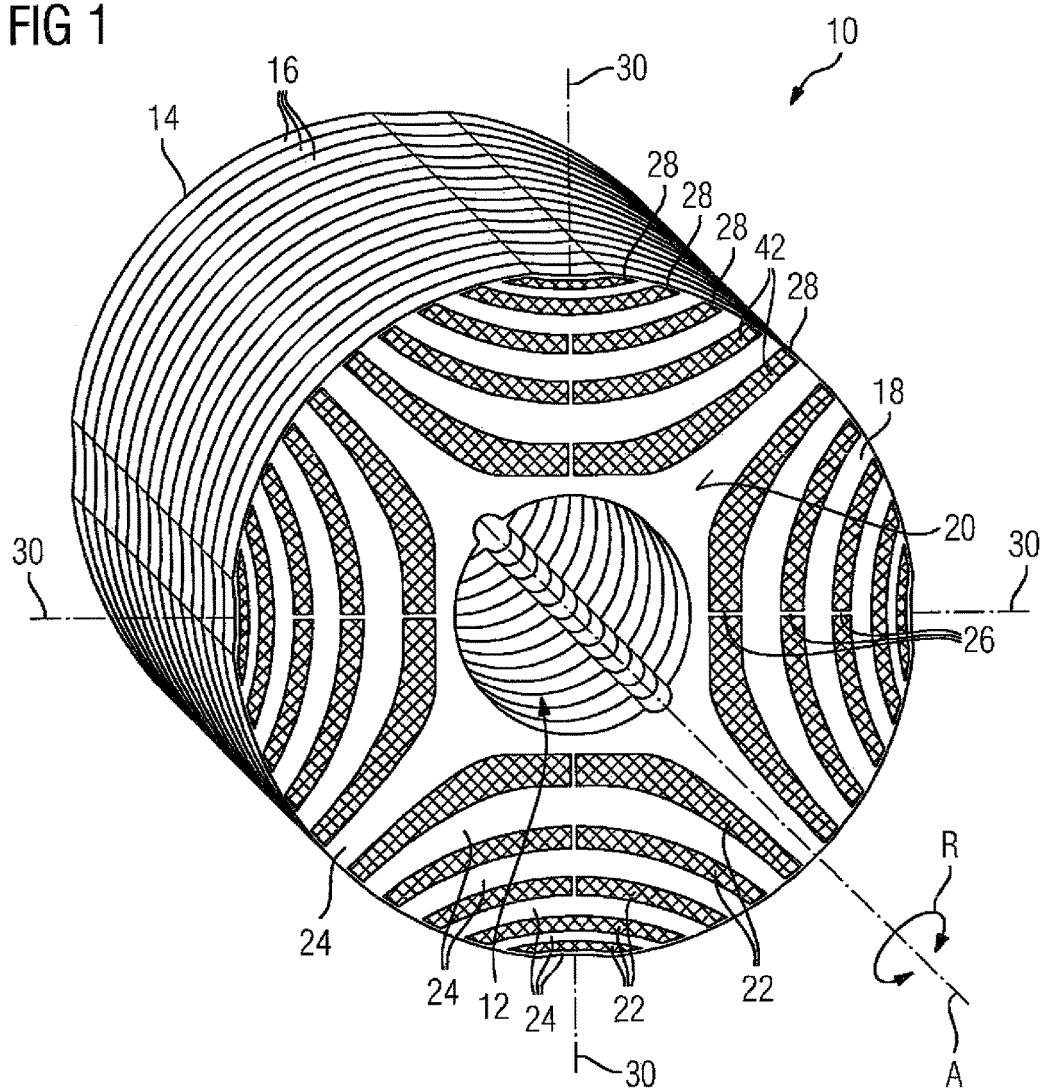

In order to manufacture such a laminated core, in which each layer is formed from a number of individual flux-guidance sections separated from one another, one form of embodiment of the method makes provision, after stacking of the sheets for an outer ring, which holds the individual flux-guidance sections together so that a single sheet section is produced, to be removed by a cutting method and through this for each of the sheets, i.e. each layer of the laminated core, to be separated into a number of rotor sheets separate from one another.

Each insert disc is preferably formed from a non-magnetic material. The advantage produced here is that the magnetic characteristics of the rotor are not influenced through the provision of the insert discs. This represents a further great advantage compared to the prior art, in which the flux-guidance sections have to be connected to one another by metal webs in order to guarantee the mechanical stability.

Preferably the insert discs disposed in the rotor have a thickness of less than 0.2 millimeters. With a prespecified axial overall length of the rotor the provision of a number of insert discs, especially with an insert disc between each of the layers, still leads to a rotor which has sufficient magnetically-conductive material. Thus, in this case too, almost the same mechanical torque can be created by means of the rotor as could be created without insert discs.

In order to provide such a thin insert disc, there is provision in accordance with one form of embodiment to provide a foil made of a polymer for the insert disc. This foil can be self-adhesive so that it can be glued to one of the magnetic layers of the laminated core and then the next layer can be laid on top of it.

Another form of embodiment makes provision for at least one insert disc, preferably all insert discs, to comprise a knitted or woven fabric impregnated with synthetic resin. A fleece or a felt can be provided here for example as a knitted fabric. Glass fiber or carbon fiber can be used as fiber for the knitted or woven fabric. By means of a knitted or woven fiber fabric an especially high tensile strength of the insert discs, as is desired for transmission of the centrifugal force between the individual flux-guidance sections, is produced. The impregnation with synthetic resin ensures the necessary mechanical stiffness here.

In order to rigidly connect an insert disc to the two layers between which it is located, in accordance with one form of embodiment there is provision for a gluing of the insert disc to the flux-guidance sections. A layer of adhesive is very thin so that no appreciable increase in the thickness of the insert disc is produced by the gluing. If synthetic resin is used said resin can also function as the adhesive.

With a rotor for a reluctance motor of the motor vehicle, but also in other areas of application, the rotor must be able to be operated alternately in both directions of rotation. In order to prevent a mutual twisting of the laminated core for both directions of rotation, especially during an acceleration, which can be made possible by the arrangement of insert discs between the laminated core sheets, a form of embodiment of the rotor has insert discs which include a knitted fabric with fibers which are aligned at an angle to a specified q-axis of the laminated core which lies in a range from 40° to 50°, especially at 45°.

In accordance with one form of embodiment of the rotor the insert disc is thicker in the non-magnetic area between two flux-guidance sections which it connects than at points where it is connected to the flux-guidance sections. In an advantageous manner a form fit is produced by this in a radial direction between the insert disc and the flux-guidance sections. This prevents the flux-guidance sections slipping radially outwards along the insert disc during a rotation of the rotor.

In order to embody the insert disc thicker between the flux-guidance sections in the described way there can be provision for example for disposing a knitted fabric, for example a fleece, as insert disc between the rotor sheets and subsequently after the entire stack of rotor sheets and insert discs inserted between them is produced, to soak the insert discs with a liquid synthetic resin. Through this the fabric between the flux-guidance sections overflows into the non-magnetic areas and thus becomes thicker. After hardening of the synthetic resin the desired form fit is then produced. To form the thick sections a woven fabric can also be soaked with synthetic resin and subsequently forces acting axially in relation to the rotor can then be applied to the laminated core.

As already stated a reluctance motor also belongs to the invention. The inventive reluctance motor is characterized by a rotor which is a form of embodiment of the inventive rotor. In the inventive reluctance motor the rotor is designed, through the alternating supply of power, to rotate the rotor at a speed which is greater than 5,000 revolutions per minute. This is not possible with conventional reluctance motors which are formed according to the Vagati principle. Only through the inventive stabilization of the laminated core by means of the support elements can these speeds be exceeded.

The inventive reluctance motor can be connected to a converter for alternate powering of coils of a stator of the reluctance motor, wherein the converter is designed, through the alternate powering, to rotate the rotor at a speed which is greater than 5,000 rpm.

The inventive reluctance motor can have a converter with which in the known way coils of the rotor of the reluctance motor can be powered alternately.

In particular there is provision for the converter to be designed to rotate the reluctance motor at a speed of more than 9,000 revolutions per minute.

Accordingly the inventive motor vehicle is characterized by having a reluctance motor in accordance with a form of embodiment of the inventive reluctance motor. Only with such a reluctance motor with a sufficiently high speed is a sensible use of the reluctance motor as a drive motor for driving the motor vehicle possible.

The invention is explained once again below on the basis of exemplary embodiments. In the figures:

FIG. 1 shows a schematic diagram of a perspective view of a form of embodiment of the inventive rotor, FIG. 2 shows a schematic diagram of a longitudinal section through a form of embodiment of the inventive rotor, FIG. 3 shows a schematic diagram of a front view of a front-face side of a form of embodiment of the inventive rotor, FIG. 4 shows a schematic diagram of a further front view of a front-face side of a form of embodiment of the inventive rotor, FIG. 5 shows a schematic diagram of a longitudinal section through a form of embodiment of the inventive electrical machine and FIG. 6 shows a schematic diagram of a form of embodiment of the inventive motor vehicle.

DETAILED DESCRIPTION OF A PREFERRED EMBODIMENT

In the exemplary embodiments explained below the components of the forms of embodiment described each represent individual features of the invention to be considered independently of one another, which also develop the invention in each case independently of one another and thus are also to be viewed individually or in a combination other than that shown as a component of the invention. Furthermore the forms of embodiment described are also able to be supplemented by further features of the invention already described.

The exemplary embodiments shown represent the preferred forms of embodiment of the invention.

In FIG. 1 and FIG. 2 a reluctance rotor or in short a rotor 10 is shown. The rotor 10 can be installed in a reluctance motor. For example the reluctance motor can be a drive motor for an electrically-driven vehicle. In the installed state a shaft (not shown) of the reluctance motor is pushed through an opening 12 of the rotor 10. The shaft and thus the rotor 10 is then supported rotatably around an axis of rotation A so that the rotor 10 can then perform a rotation R around the axis of rotation A in a stator (not shown) of the reluctance motor. A diameter of the rotor 10 in the radial direction can amount to more than 20 cm. A length of the rotor 10 in the axial direction can amount to more than 30 cm.

The rotor 10 has as its magnetically-active part a laminated core 14 which is formed from a number of layers 16 which each comprise soft-magnetic, especially ferromagnetic material. Located between the layers in each case is an electrically-insulating layer in order to block eddy currents in the laminated core 14. For the sake of clarity only a few of the magnetic layers 16 are provided with a reference character in FIG. 1. Each layer 16 is formed by a rotor sheet 18 in the example shown in FIG. 1 and FIG. 2. In FIG. 1 only the rotor sheet 18, which is located on an end-face side 20 in the axial direction along the axis A at the front end is provided with the reference character. The rotor sheet 18, (and accordingly also the other rotor sheets of the other layers 16) has cutouts 22 which form magnetic inhibitors. The rotor sheets are disposed flush axially behind one another in the laminated core such that the cutouts 22 and accordingly also the flux-guidance section 24 axially align with one another. The rotor sheets of the layers 16 can all have the same shape. The cutouts 22 can for example be formed by punching out the corresponding shapes from rotor sheet 18. The cutouts 22 form non-magnetic areas in each layer 16 and function as magnetic flux inhibitors.

Of the rotor sheet 18 thus only flux-guidance sections 24 and webs 26 for mechanical connection of the flux-guidance sections 24 and also an outer ring 28 for mechanical connection of the flux-guidance sections 24 are present. By means of the flux-guidance sections 24 a magnetic flux which is created by electrical coils of the stator is guided transverse to the q-axes 30 of the rotor 10 along a magnetic preferred direction in the reluctance motor.

The cutouts 22 mean that the mechanical stability of each rotor sheet 18 is less than for a rotor sheet which is embodied (except for the through-opening 12) as a massive disc. With the rotor 10 however it is still made possible for it to operate the reluctance motor at a speed of more than 5,000 revolutions per minute, especially at 10,000 revolutions per minute and even 15,000 revolutions per minute. To this end the rotor 10 is mechanically stabilized. An insert disc 32 is disposed in each case between the individual layers 16 for this purpose for each second or each third layer. So that the insert disc 32 can be seen more easily, the rotor 10 is shown greatly enlarged in FIG. 2, so that only two of the rotor sheets 18 are shown. The rotor continues in an axial direction along the axis of rotation A on the other side of break lines 34. The insert discs 32 do not have the cutouts 22 like the rotor sheets 18. They extend in a radial direction 36 at right angles to the axis of rotation A continuously from the shaft of the reluctance machine to an outer edge 38 of the laminated core 14. The insert discs 32 thus bridge the through-openings 22. The insert discs 32 are rigidly connected to the flux-guidance sections 24. Through the insert discs 32 a centrifugal force acting on the individual flux-guidance sections 24 for a rotation of the rotor 10 can be transmitted along the radial direction 36 towards the shaft of the electrical machine, i.e. can be transmitted radially inwards.

A thickness of the insert discs 32 in the axial direction preferably amounts to less than 0.1 mm. Each insert disc 32 can be formed from an adhesive film for example which can also be reinforced by glass fibers or carbon fibers. A fleece or a woven fabric of fibers can also be provided as the insert disc 32, which is preferably formed from glass fibers or carbon fibers. The fleece or woven fabric can subsequently, after it has been arranged during the stacking of the rotor sheets 18 between said sheets, have been impregnated with a synthetic resin by casting or soaking. In such cases the insert disc 32 can swell up so that raised areas 40 form in the cutouts 22 in which the insert disc 32 has a greater diameter in an axial direction along the axis of rotation A, i.e. is thicker than it is between the flux-guidance sections 24. Another very suitable material for providing the insert discs 32 is the woven fabric which is obtainable under the product name Prepreg® of the company Lange-Ritter. This involves a reinforcement fiber which is already impregnated with resin. When the fiber is heated up the resin liquefies for a short time and soaks through the fibers before it begins to harden. A further very suitable weave is represented by glass fiber fabric or glass fabric, as is provided for example by the company HexForce®.

When a woven fabric is used an additional stability can be obtained when the direction in which the fibers of the woven fabric run is aligned at an angle of between 40° and 50° to the q-axes 30. This direction is illustrated in FIG. 1 on the basis of individual, highlighted fabric fibers 42. The hatched areas in FIG. 2 on the other hand do not show the directions in which the fibers run.

When the laminated core 40 is manufactured, when the synthetic resin in the insert discs 32 is still liquid, axial pressure forces 44 are applied to the laminated core 14 so that the rotor sheets 18 remain disposed at a desired spacing from one another, while the insert discs 32 swell up in the area of the raised areas 40. The raised areas 40 have the advantage that a form fit is made under tension when the laminated core 14 is tensioned.

The laminated core becomes especially stable when the cutouts 22 are likewise filled with synthetic resin. Casting resin diluted with water can be used for this purpose, which can penetrate through the insert discs 32 into the hollow spaces between the flux-guidance sections 24.

When the resin hardens the insert discs 32 are linked to the rotor sheets 18. Depending on the material of the insert discs, this occurs by adhesion and with form fits possibly additionally being made in the area of the raised sections 40. The flux-guidance sections 24 are fixed to one another with the insert discs by this. In such cases the areas in the rotor sheets 18 which are unstable at high speeds of the rotor 10 are linked to the stable areas by an overall composite unit. In the areas of the flux inhibitors, i.e. cutouts 22 through capillary action of penetrating casting resin or impregnating resin the form fit is additionally made at the raised areas 40. To make it possible for the resin to penetrate, the optimum adhesion gap, i.e. the gap 46 of the flux-guidance sections of neighboring rotor sheets 18 is in the range of 0.1 mm. If this involves fabrics, these are pushed together during application of the pressure forces 44 until the glass fibers or carbon fibers lie firmly against each other. This then determines the final distance 46. The thickness of the insert parts should be as small as possible but should make penetration of the casting compound (resin) by capillary action possible. Widths ranging from 20 μm to 40 μm are considered as optimum widths.

Alternative forms of embodiment of rotors are shown in FIG. 3 and FIG. 4, in which individual magnetic layers 16 are embodied differently. These forms of embodiment have the advantage that the necessary magnetic flux guidance for embodying the reluctance is influenced to an even lesser extent than in the rotor 10 by support elements, such as the webs 26 and the ring 28. For better orientation, elements in FIG. 3 and FIG. 4 which correspond, as regards their function, to elements which are shown in FIG. 1 or FIG. 2 are provided with the same reference characters as in FIG. 1 or FIG. 2.

In FIG. 3 a magnetic layer 16 of a rotor is shown in which a number of flux-guidance sections 24 are provided which are likewise separated from one another by the cutouts 22 but which exclusively are held together by an outer ring 28. At the location 48 at which the webs 26 are present for the rotor sheets 18 of the rotor 10, with the magnetic layer 16 in FIG. 3, there is likewise a non-magnetic area, as is formed by the cutouts 22.

FIG. 4 shows a magnetic layer of a rotor, in which individual flux-guidance sections are formed from rotor sheets 18' separated from one another, between which in each case non-magnetic areas 22', i.e. especially air or synthetic resin, are located.

A rotor with magnetic layers 16, as is shown in FIG. 4, can be formed for example from a rotor with one magnetic layer, as is shown in FIG. 3. In that a rotor from FIG. 3 is machined by a metal-working method of the outer ring 28 after the individual magnetic layers have been fixed to one another by the insert discs 32 a rotor with one magnetic layer 16 is obtained, as is shown in FIG. 4.

The examples show the how the following advantages can be obtained for a reluctance motor. The speed compatibility of the rotor 10 is increased. The width of the connecting webs on the outer diameter along the outer side 38, i.e. the outer ring 28, can be very small. Webs between the flux-guidance sections 24 can also be dispensed with, as is shown in FIG. 3 and FIG. 4. The metal cutting on the outer diameter of the rotor 10 necessary for adapting the outer diameter of the rotor 10 to a stator is easier through the increased stability of the laminated core 14 and can thus be carried out at lower cost. Since a bandage for stabilizing the laminated core 14 which must be wound around the laminated core 14 can be dispensed with, an optimized air gap is produced for the reluctance motor. The insert discs 32 can also be used for the described electrical insulation of the individual sheets 18 in relation to one another. Then the rotor sheets 18 do not have to be additionally lacquered. The laminated core 14 of the rotor 10 has an improved inherent bending frequency on the material through the composite unit, through which the rotor laminated core 14 is also suitable for stabilizing the shaft of the reluctance motor. A reduction of the torsion oscillations during operation of the reluctance motor is also achieved by this. By choosing the number of insert discs 32 a modular speed suitability can be set. For the highest stability insert discs should be provided between all layers 16, for a lower speed compatibility it is sufficient to have insert discs between each second or only between each third and fourth layer. In one form of embodiment of the invention it is even possible to dispense with the outermost webs, i.e. the outer ring 28 between the flux-guidance sections 24, as is shown in FIG. 4, since the complete unit is inherently fixed, i.e. is carried, by the insert discs.

FIG. 5 shows an electrical machine 50 which preferably involves a reluctance motor. In FIG. 5 the axis of rotation A also represents an axis of symmetry. The electrical machine 50 is especially embodied as an electrical drive motor for a motor vehicle, especially an automobile. The electrical machine 50 includes a stator 52 in which windings 54 of electrical coils are disposed, wherein in FIG. 5 only one of the windings 54 is shown. The windings 54 are powered alternately by a converter C, wherein a magnetic rotating field arises within the stator 52 in an air gap 56 of the electrical machine 50. Inside the stator 52 is located a rotor 58 which is connected to a shaft 60 in a torsion-proof manner. The shaft 60 is supported in the stator 52, able to be rotated around an axis of rotation A. The rotor 58 is a form of embodiment of the inventive rotor, for example the rotor 10.

FIG. 6 shows a schematic diagram of a motor vehicle 62, which can be an automobile for example. The motor vehicle 62 has an electrical drive motor 64, in the housing 66 of which for example the electrical machine 50 or another form of embodiment of the inventive electrical machine can be located. The shaft 60 of the electrical machine 42 can be coupled for example with a drive train 68 of the motor vehicle 62. The drive train 68 can for example drive a rear wheel 70 of the motor vehicle 62.

What is claimed is:

1. A rotor for a reluctance motor, comprising:
   a laminated core including multiple layers electrically insulated from one another and extending radially away from an axis of rotation of the rotor;
   at least one magnetically-conductive rotor sheet having multiple flux guidance sections in each layer separated from one another by a non-magnetic area; and
   at least one insert disk disposed in a non-magnetic area between at least two of the layers, said insert disk being linked to at least two flux guidance sections of at least one of the layers between which it is disposed, so as to connect these flux guidance sections to each other across the non-magnetic area between them, said insert disc being configured in one of two ways, a first way in which the insert disc is woven of fibers having a weave that is aligned at an angle ranging between 40° an 50° to a given q-axis of the laminated core, a second way in which the insert disc is thicker in the non-magnetic area between two flux guidance sections that it connects than a thickness of the flux guidance sections, so as to make a form fit with the flux guidance sections in a radial direction.

2. The rotor of claim 1, wherein the insert disc is made of a non-magnetic material.

3. The rotor of claim 1, wherein the insert disc has a thickness of less than 0.2 mm.

4. The rotor of claim 1, wherein the insert disc comprises a film made of a polymer.

5. The rotor of claim 1, wherein the insert disc comprises a resin-bonded knitted or woven fabric.

6. The rotor of claim 1, wherein the insert disc is connected to the flux guidance sections by gluing.

7. The rotor of claim 1, wherein the insert disc comprises woven fibers, having a weave that is aligned in relation to a given transverse axis of the laminated core at an angle which lies at 45°.

8. The rotor of claim 1, wherein at least one of the layers has a number of rotor sheets separated from one another, each sheet forming one of the flux guidance sections of the layer.

9. The rotor of claim 1, wherein an insert disc of the said type is disposed in each case between a number of the layers, especially between all layers.

10. A reluctance motor, comprising a rotor including a rotor having a laminated core including multiple layers electrically insulated from one another and extending radially away from an axis of rotation of the rotor, at least one magnetically-conductive rotor sheet having multiple flux guidance sections in each layer separated from one another by a non-magnetic area, and at least one insert disk disposed in a non-magnetic area between at least two of the layers, said insert disk being linked to at least two flux guidance sections of at least one of the layers between which it is disposed, so as to connect these flux guidance sections to each other across the non-magnetic area between them, said insert disc being configured in one of two ways, a first way in which the insert disc is woven of fibers having a weave that is aligned at an angle ranging between 40° an 50° to a given q-axis of the laminated core, a second way in which the insert disc is thicker in the non-magnetic area between two flux guidance sections that it connects than a thickness of the flux guidance sections, so as to make a form fit with the flux guidance sections in a radial direction.

11. A motor vehicle, comprising a reluctance motor as drive motor for driving the motor vehicle, said reluctance motor comprising a rotor having a laminated core including multiple layers electrically insulated from one another and extending radially away from an axis of rotation of the rotor, at least one magnetically-conductive rotor sheet having multiple flux guidance sections in each layer separated from one another by a non-magnetic area, and at least one insert disk disposed in a non-magnetic area between at least two of the layers, said insert disk being linked to at least two flux guidance sections of at least one of the layers between which it is disposed, so as to connect these flux guidance sections to each other across the non-magnetic area between them, said insert disc being configured in one of two ways, a first way in which the insert disc is woven of fibers having a weave that is aligned at an angle ranging between 40° an 50° to a given q-axis of the laminated core, a second way in which the insert disc is thicker in the non-magnetic area between two flux guidance sections that it connects than a thickness of the flux guidance sections, so as to make a form fit with the flux guidance sections in a radial direction.

12. A method for manufacturing a rotor, said method comprising:
    forming each magnetic layer of the laminated core using a conductive metal sheet that has flux guidance sections in which cutouts are provided as non-magnetic areas between the flux guidance sections; and
    fitting the metal sheets into the laminated core so that an insert disc is disposed between two of the metal sheets and is connected to at least one adjoining sheet; and
    impregnating the insert disc with a synthetic resin after fitting all the metal sheets and insert discs, so that the resin penetrates between the flux guidance sections into the non-magnetic areas and the insert disc thus becomes thicker.

13. The method of claim 12, wherein the insert disc is made of a knitted fabric or a woven fabric.

14. The method of claim 12, further comprising removing an outer ring of each of the magnetically-conductive sheets after the fitting of the metal sheets, so that each of the metal sheets is separated into a number of rotor sheets that are separate from one another.

* * * * *